United States Patent [19]
Van Cleve

[11] Patent Number: 5,814,739
[45] Date of Patent: Sep. 29, 1998

[54] CORIOLIS FLOWMETER HAVING CORRUGATED FLOW TUBE

[75] Inventor: Craig Brainerd Van Cleve, Lyons, Colo.

[73] Assignee: Micro Motion, Incorporated, Boulder, Colo.

[21] Appl. No.: 865,853

[22] Filed: May 30, 1997

[51] Int. Cl.$^6$ .................................................. G01F 1/84
[52] U.S. Cl. ........................................................ 73/861.357
[58] Field of Search ..................... 73/861.357, 861.355, 73/861.354

[56] References Cited

U.S. PATENT DOCUMENTS

| | | | |
|---|---|---|---|
| 3,329,019 | 7/1967 | Sipin | 73/861.357 |
| 4,840,071 | 6/1989 | Lew | 73/861.357 |
| 5,078,014 | 1/1992 | Lew | 73/861.355 |
| 5,323,658 | 6/1994 | Yao et al. | 73/861 |
| 5,359,881 | 11/1994 | Kalotay et al. | 73/54 |
| 5,448,921 | 9/1995 | Cage et al. | 73/861.357 |
| 5,476,013 | 12/1995 | Hussain et al. | 73/861 |
| 5,663,509 | 9/1997 | Lew et al. | 73/861.357 |

*Primary Examiner*—Richard Chilcot
*Assistant Examiner*—Harshad Patel
*Attorney, Agent, or Firm*—Duft, Graziano & Forest, PC

[57] ABSTRACT

A Coriolis flowmeter having flow tubes with corrugations in the dynamically active portion of the flow tubes. The corrugations increase the flexibility of the flow tubes so that they are more responsive to the generated Coriolis forces. This enhances the flowmeter sensitivity. Corrugations in a straight flow tube also reduce thermally induced stresses on the flow tube when its axial length is constrained by a surrounding case or balance bar to which the flow tube ends are affixed. Corrugations may be selectively positioned on the flow tube to control the flow tube vibrational response for the fundamental drive mode as well as harmonics thereof.

21 Claims, 4 Drawing Sheets

5,814,739

CORIOLIS FLOWMETER HAVING CORRUGATED FLOW TUBE

FIELD OF THE INVENTION

This invention relates to Coriolis flowmeters, and in particular, to a Coriolis flowmeter having a corrugated flow tube.

PROBLEM

Straight tube type Coriolis mass flowmeters are known in the art. They may consist of flowmeters having a single straight flow tube, a cylindrical balance tube surrounding the flow tube, together with a still larger cylindrical case that encloses both the flow tube and the balance tube. The balance tube is rigidly fixed at each end to the flow tube by a brace bar. The case is affixed to the flow tube at each of its ends by thick end plates. The flow tube extends beyond the case ends and is connected by flanges to a pipeline. The flowmeter case provides physical protection for the flowmeter elements enclosed within the case. These elements may comprise sensitive devices, such as drivers, sensors, and associated electronic elements. It is desired that these elements be physically protected from the environment in which the flowmeters are operated. This protection is provided by the case which is advantageously made of relatively strong material of sufficient thickness.

In operation, the flow tube is electromechanically vibrated out-of-phase with respect to the balance tube which is provided to reduce the vibrations that would be associated with a single unbalanced flow tube. These vibrations impart a Coriolis acceleration to material flowing through the flow tube. The reaction force to this Coriolis acceleration results in a slight distortion to the vibration mode shape of the flow tube. This distortion is measured by sensors connected to, or associated with, the flow tube. The sensors may be either of the velocity or displacement type. The material flow rate is proportional to the time or phase delay between the signals generated by two such sensors positioned along the length of the straight flow tube. A single sensor may also be used. Output signals of the sensors are applied to electronic apparatus which derives the desired information, such as mass flow rate, for the material in the flow tube.

Dual straight tube Coriolis flowmeters are also known. These are similar to the single straight tube flowmeters except that they have a second flow tube in parallel with the first flow tube. The second flow tube replaces the balance bar of the single flow tube embodiment. The two flow tubes are connected at their ends to flow diverter manifolds which divide the received material flow between the two flow tubes. Dual flow tube meters may or may not have brace bars connecting the flow tubes to each other. The tubes of dual tube Coriolis mass flowmeters vibrate out-of-phase with respect to each other rather than out-of-phase with a balance bar. Other than this, their operation is identical to a single straight tube flowmeter.

Mass flow measurement in both types of straight tube Coriolis flowmeter is dependent upon the flow tube distortion or flexing resulting from the Coriolis forces generated by the material flow and the concurrent electromechanical vibration to which the flow tube is subjected. It is often desired that Coriolis mass flowmeters have an accuracy that approaches 0.1 percent of reading. To achieve this accuracy, it is necessary that the distortion of the flow tube be dependent solely upon the generated Coriolis forces rather than being affected by external forces and stresses such as those generated by differences in operating temperatures between the various portions of the flowmeter. These stresses can generate undesirable axial tension or compression in the flow tubes.

Axial tension tends to stiffen flow tubes and make them less responsive to the generated Coriolis forces. This results in an under reporting of the true flow information generated by the Coriolis forces. Likewise, axial compression softens the flow tube and results in an over reporting of the generated Coriolis flow information. Traditionally, manufactures of straight tube Coriolis flowmeters have made the case ends extremely rigid so that forces generated by externally applied loads are transferred by the rigid case ends to the case rather than to the flow tubes. This successfully isolates flow tubes from external loads, but the rigidity of the case and the case ends causes problems resulting from thermal expansion/contraction of the flow tube and temperature differences between the flow tube and the flowmeter case.

In straight tube Coriolis flowmeters, the temperature differences that often exist between the material within the flow tube and the air external to the flowmeter case can cause the flow tube to have a different temperature than the case. This results in a difference in the amount of thermal expansion of the flow tube and that of the case. The rigid case ends inhibit this differential expansion and generate an axial force that compresses (or stretches) the flow tube axially resulting in high axial stress in the flow tube and errors in the indicated flow rate.

Thus, a temperature differential between a flow tube and its case results in axial stresses on the flow tube of either of axial compression or axial tension. In addition to affecting the flowmeter accuracy, these stresses can exceed the yield stress of the material comprising the flow tube. An axial tension stress can tear the flow tube ends apart from the case ends or can tear the flow tube itself. The stress can also permanently deform the flow tube material so as to permanently change its calibration factor and render it useless. For example, if a stainless steel flow tube is 20 inches long and is 200° F. hotter than the case, it will attempt to expand 0.036 inches more than the case. If the case and case ends are relatively rigid, this attempted expansion can generate a compressive stress of approximately 50,000 pounds per square inch in the flow tubes. This stress may be sufficiently high so as to yield or deform the flow tube. Similar conditions exist when the flow tube is colder than the case except that the stress is tensile rather than compressive.

Two means are traditionally used to lessen thermally induced stresses. The most common of these is to make the flow tube out of a material having a lower co-efficient of thermal expansion than the material from which the case is made. Titanium is typically used for the flow tube because of its low co-efficient of expansion and good corrosion resistance. Stainless steel, which has approximately twice the thermal coefficient of expansion of titanium, is then used for the case. The temperature of the case is determined by the inflow of heat from the hotter (in this example) flow tube and the loss of heat to the cooler atmosphere. By properly designing the conduction path from the flow tube to the case, the flowmeter is designed so that the case equilibrium temperature is half way between the flow material temperature and the ambient air temperature. Because the expansion coefficient of the case is twice that of the flow tube, this results in a flow tube axial stress that is independent of the fluid temperature. However, the difference in thermal expansion coefficients between the tube and the case ensures that the tube stress is now a function of ambient temperature. On a hot day, the case will expand more than the tube resulting in tube tension while on a cold day the case will contract more than the tube resulting in tube compression. This fix for thermal stress only trades a sensitivity to fluid temperature for a sensitivity to ambient temperature.

Another significant problem with making the case and the flow tube of different materials is the cost of manufacturing. Titanium is expensive and difficult to fabricate. It cannot be welded to stainless steel by conventional processes and can only be brazed to the stainless steel case with difficulty.

The other widely used practice and method of reducing thermally induced tube stresses is to design a geometric strain relief into the flow tube. Bent tube flowmeters fall into this category. This includes those whose flow tubes are U shaped, V shaped, as well as all other flow tubes having an irregular shape other than straight. With straight tube flowmeters, the strain relief is traditionally located between the case end and a brace bar element near the case end. In this location the flow tube is dynamically inactive and thus the nature of the strain relief does not effect the dynamics of the vibrating portion of the flow tube. Among the various designs of strain relief used are o-ring, slip joints, metal bellows, and a reduction in flow tube diameter which serves the function of a diaphragm. These strain relief methods adequately perform their intended function, but they have their own unique problems.

The primary problem with the bellows and slip joint designs is that they are not easily cleanable. This is a significant problem in that cleanability is one of the most common reasons that customers give in selecting a straight tube flowmeter. Flowmeters that use a reduction in flow tube diameter near the tube ends for strain relief often suffer from the disadvantageous of high fluid pressure drop. Other geometric designs exist, but they all suffer from the disadvantageous such as cleanability, pressure drop, or drainability.

The above has discussed the problems associated with the thermal stress relationship between flow tubes and a surrounding case. In a single tube flowmeter having a balance tube affixed to the flow tube, the relationship between the balance tube and the flow tube is the same as between the case and the flow tube in so far as temperature differences and thermal stresses are concerned. The balance tube is normally rigidly affixed to the flow tube by the end portions of the balance tubes. Thus, the expansion problems between the flow tube and the balance tube are the same as those above described between the flow tube and the case.

It should also be appreciated that although there are various techniques for minimizing the problem of flow tube expansion/contraction for flowmeters having thick noncompliant cases, none are without disadvantages. In particular, the problems of thermal gradients and varying ambient temperatures remain unsolved.

SOLUTION

The present invention overcomes the above described problems and achieves an advance in the art by providing a flowmeter in which the flow tubes are of a geometry such that they are axially compliant in the area in which they are dynamically active. The axial compliance of the flow tubes allows them to contract and expand axially relative to the flowmeter case and the balance tube (when provided) with reduced axial stress on the flow tubes. This allows the flow tube, the flowmeter case, and the balance tube to be made of the same material. Furthermore, by locating the compliant areas in the flow tube's dynamically active region, flowmeters can be built having increased accuracy with regard to measuring flow and density.

The flow tubes of the present invention achieve greater axial compliance than prior art flow tubes by means of a corrugated geometry in their dynamically active region rather in their dynamically inactive region. The corrugations are similar to those on conventional steel culverts in that the periodic increase and decrease in the tube diameter occurs in the axial direction of the tube. Corrugations increase the axial compliance of the flow tube by changing the axial deformation of the flow tube wall from pure tension or compression, as found in a straight walled flow tube, to a combination of wall bending plus greatly reduced tension or compression. The wall bending of the corrugated flow tube is axisymmetric such that the flow tube remains straight while being deformed axially.

Thus, the corrugated flow tube solves the problem of thermal stress since a surrounding meter case and/or balance bar that is of a lower temperature than the flow tube can axially compress the corrugated flow tube without producing stresses sufficient to damage the flow tube or significantly change the flow sensitivity. Likewise, a surrounding flow tube case and/or balance tube of higher temperature than the flow tube can axially stretch the corrugated flow tube without damage or sensitivity change.

Corrugations in the dynamically active flow tube region has the further advantages of an increased sensitivity to material flow over a conventional flow tube. Along with the corrugated tube's ability to be axially compressed with little force and no permanent deformation, it can be bent with little force and no permanent deformation. Softening the flow tube in bending has three effects on sensitivity of the meter. Two of these effects cancel each other while the third increases flow sensitivity. A uniformly corrugated flow tube has reduced stiffness which results in a lower drive frequency. The reduced frequency has two effects. First, it reduces the Coriolis force for a given material flow rate. The Coriolis force is proportional to the tube's angular velocity. Decreasing the flow tube frequency decreases angular velocity and thus Coriolis force. The decreased force results in decreased (flow induced) tube deformation. The decreased flow induced tube deformation would result in a decreased time delay between signals generated by the two flow tube sensors except for the fact that decreased frequency also results in decreased tube velocity. The decreased tube velocity results in a longer time delay for a given tube deformation. It turns out that the effects of decreased tube velocity (increases time delay) and decreased Coriolis force (decreases time delay) cancel each other resulting in a time delay between sensors (flow signal) that is independent of frequency.

The third effect of the corrugations on the flowmeter sensitivity is that the increased ease of bending results in a larger response to the generated Coriolis force. The net effect is that the sensitivity to material flow of the corrugated flow tube meter is significantly greater than the sensitivity of a meter with a conventional flow tube. The effect of the decreased drive frequency is canceled by the effect of the decreased tube velocity. However, the tube's increased responsiveness to Coriolis force results in a net increase in the meter sensitivity.

The placement of corrugations along the flow tube need not be uniform and, in fact, there are several advantages to nonuniform placement of the corrugations. The deformed shape of the flow tube resulting from the drive vibrations with no material flow is known as the drive mode shape and it has two points, known as inflection points, at which the direction of the flow tube curvature changes. For a short region around these inflection points there is no curvature and thus there can exist no bending moments. (A bending moment on a normally straight tube always results in a curved tube.) Since there are no bending moments at the inflection points of the drive mode, corrugations can be located there and their bending softness will have little impact on drive mode shape or the flow tube drive frequency. In the Coriolis deflection shape, however, these same locations (drive mode inflection points) on the tube experience large curvature and bending moments. Corrugations in these location (drive mode inflection points) therefore result in a large decrease in stiffness with respect to generated Coriolis forces. During material flow the tube is periodically deflected in the drive mode shape while simultaneously (90 degree phase shifted) being distorted by the Coriolis force. Thus, locating the corrugations selectively at the inflection points for the drive mode results in a meter with high drive frequency and high Coriolis forces and, simultaneously, with high sensitivity to Coriolis forces.

The placing of corrugations at flow tube vibration mode inflection points so as to have little impact on flow tube stiffness or frequency in that mode, or alternatively, at the flow tube high bending points to have a high impact on flow tube stiffness and frequency, can be used for tuning modes of vibration besides the drive mode. For instance, sometimes a higher mode of vibration will occur at a frequency that is a multiple of the drive mode. This can cause interference with the flow signal which is derived from a measurement of the tube distortion at drive frequency. This interference can be avoided by shifting one of the flow tube frequencies by use of corrugations in a flow tube region that has high bending in one mode shape and low bending or an inflection point in the other mode shape.

Another advantage of corrugated flow tubes is that the use of corrugations enables material density to be measured with greater accuracy. A Coriolis meter measures density from the natural frequency of the flow tube in the drive mode. The flow tube is calibrated for density by recording the natural frequencies of the flow tube containing two different materials of known density (usually air and water). Densities of other materials are then determined through interpolation (or extrapolation) from their natural frequencies. A large flow tube frequency shift between air and water results in higher density resolution than a small frequency shift. A corrugated flow tube, due to the increased containment volume of the corrugations, has a higher frequency shift between air and water and thus a higher density accuracy than a straight walled tube.

Another advantage of locating the corrugations in the dynamically active region of the flow tube is that doing so allows ample room for multiple corrugations without increasing meter length. Multiple corrugations allow each corrugation to be smaller because each corrugation needs to accommodate less axial compliance. For example, if a flow tube attempts to expand/contract a given amount due to thermal differences, and if it is desired to use corrugations to relieve the axial stress on the flow tube due to this thermal expansion/contraction, it can be appreciated that the amount of expansion/compression that must be accommodated by each corrugation is related to the number of corrugations available to accommodate the expansion/contraction. These multiple small corrugations are characterized by a smaller difference between the major and minor diameters than would be larger corrugations. This smaller difference results in better ability of the tube to be cleaned as well as lower pressure drop than a tube with few large corrugations.

DESCRIPTION OF THE DRAWINGS

These and other advantages and objects of the invention may be better understood from a reading of the following detailed description thereof taken in conjunction with the drawings in which.

DETAILED DESCRIPTION

Figure 1:
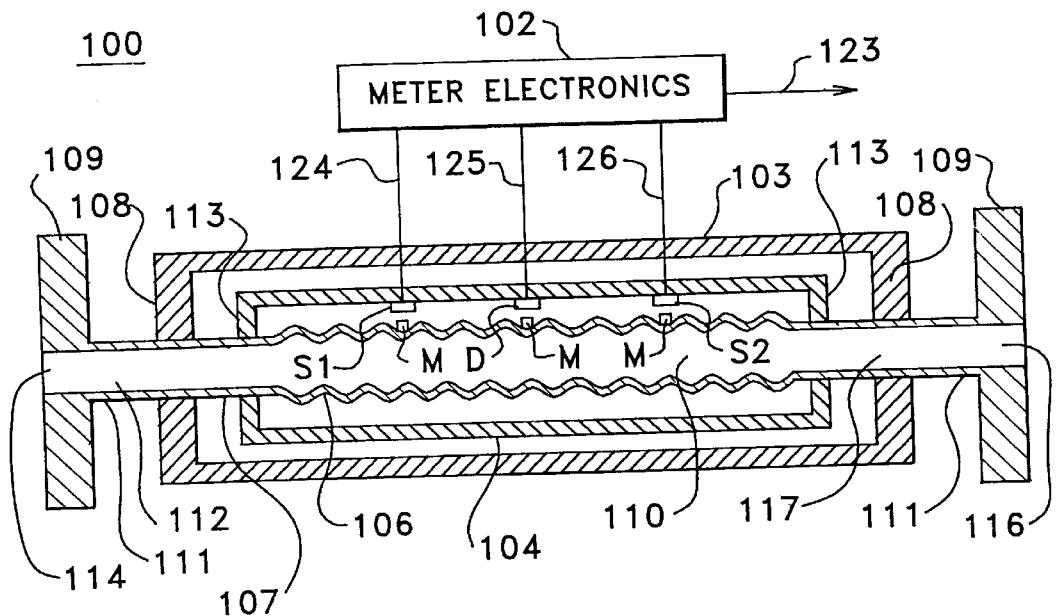
FIG. 1 discloses a straight tube Coriolis flowmeter having corrugations.

FIG. 1 discloses a Coriolis flowmeter 100 having a corrugated flow tube 110 surrounded by a cylindrical balance bar 104, and a case 103 which surrounds both balance bar 104 and flow tube 110. The ends of flow tube 110 extend through case ends 108 and are affixed to flanges 109 which, in turn, may be affixed to a flow system (not shown). The flow tube has an inlet 114 and an outlet 116. Inlet 114 is coupled by stub 111 to end portion 112 of flow tube 110 while outlet 116 by stub 111 is coupled to end portion 117 of flow tube 110. End portion 112 is rigidly fixed to both case end 108 and the end portion 113 of balance bar 104. End portion 117 is rigidly connected to the right case end 108 as well as to the right end 113 of cylindrical balance bar 104.

Magnets M associated with sensors S1, S2, and driver D are affixed to the flow tube 110. Sensor elements S1, S2, and driver element D are connected by conductors 124,125, and 126 respectively, to meter electronics 102 which contains the well known circuitry required to apply drive signals to driver D over path 125, as well as to receive sensor signals over paths 124 and 126 indicative of the Coriolis vibrations of flow tube 110. Meter electronics 102 receives the sensor signals and, in a well known manner, derives information pertaining to material flow through flow tube 110. This information can include material density, volumetric flow rates, as well as mass flow rates and is applied to path 123.

In the operation of the flowmeter 100, thermal differences can arise between flow tube 110, the surrounding cylindrical balance bar 104, and the surrounding cylindrical case 103. These thermal differences can cause axial stresses in flow tube 110 as it tends to expand/contract relative to the amount that balance bar 104 and/or case 103 attempts to expand/contract due to these thermal changes. The thick ends 113 of balance bar 104 and the thick ends 108 of case 103 inhibit the flow tube 110 from expanding/contracting axially relative to balance bar 104 and case 103. For example, the thick end portion 113 of balance bar 104 prevents flow tube 110 from assuming an axial length different than that of balance bar 104. The same is true with regarding to the relationship between the length of flow tube 110 and case ends 108. Any attempt by the flow tube to expand/contract by a different axial mount than that of the balance bar 104 and/or case end 108 creates an axial stress on flow tube 110. This stress is greatly reduced by corrugations 106 which flex axially so that flow tube 110 can remain at the same length as that of end portions 113 of the balance bar 104 and case end 108 of case 103. The corrugations permit flow tube 110 to expand/contract in unison with balance bar 104 and case 103 to largely eliminate axial stresses on flow tube 110.

Figure 2:
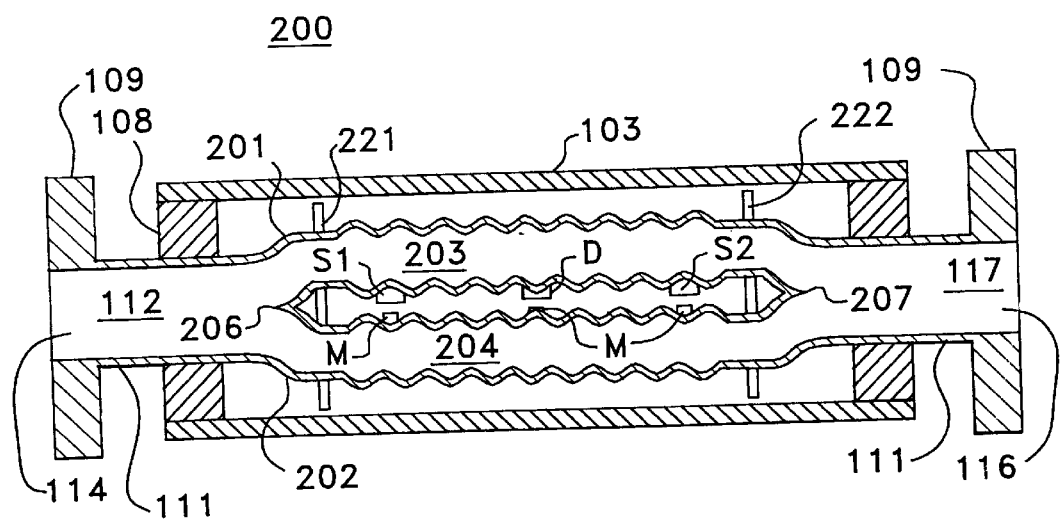
FIG. 2 discloses a dual straight tube Coriolis flowmeter having corrugated flow tubes.

Description of FIG. 2

FIG. 2 discloses a flowmeter 200 having a pair of straight corrugated flow tubes 203 and 204 contained within a case 103. The two flow tubes 203 and 204 join at apex 206 to form an inlet 112. The two flow tubes join at apex 207 to form an outlet 117. Inlets 112 and outlets 117 terminate in flanges 109. Inlet portion 112 is connected to left hand case end 108 and outlet portion 117 is affixed to right hand case end 108. Material entering inlet 114 on the left flows to the right, encounters apex 206 where it divides and flows through flow tubes 203 and 204. The output of flow tubes 203 and 204 merges at apex 207 and flows through flow tube portion 117 to outlet 116 and flange 109. The flow tube stubs 111, on both FIGS. 1 and 2, connect the case ends 108 with flanges 109. Flow tube 200 also includes sensors S1 and S2 and driver D together with their cooperating magnets M. The conductor paths connecting the sensors and the driver to meter electronics comparable to meter electronics 102 of FIG. 1 is not shown in order to minimize the complexity of the drawing. The dynamically active portion of flow tubes 203 and 204 is that between brace bar 221 and 222. The static portion of the flow tubes is to the left of brace bar 221 and to the right of brace bar 222.

Figure 3:
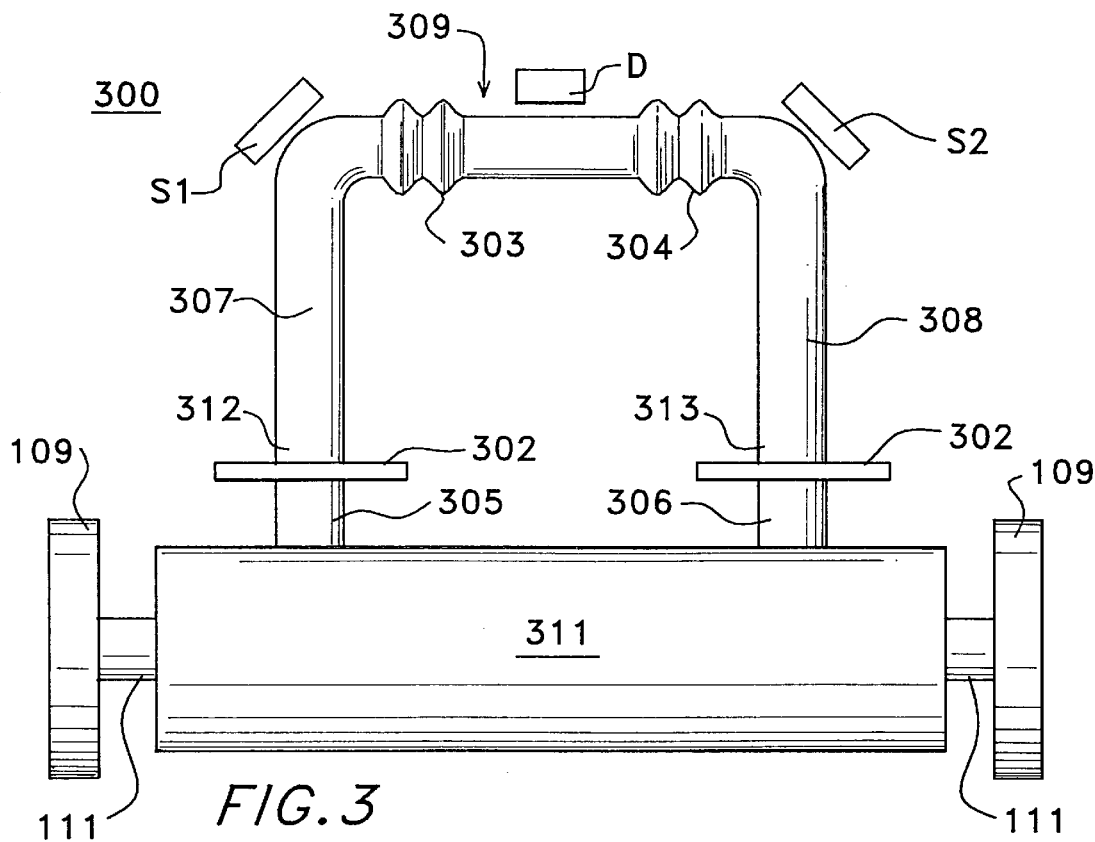
FIGS. 3 and 4 disclose a Coriolis flowmeter having a pair of substantially U-shaped corrugated flow tubes having corrugations over only a portion of the flow tube.
Figure 4:
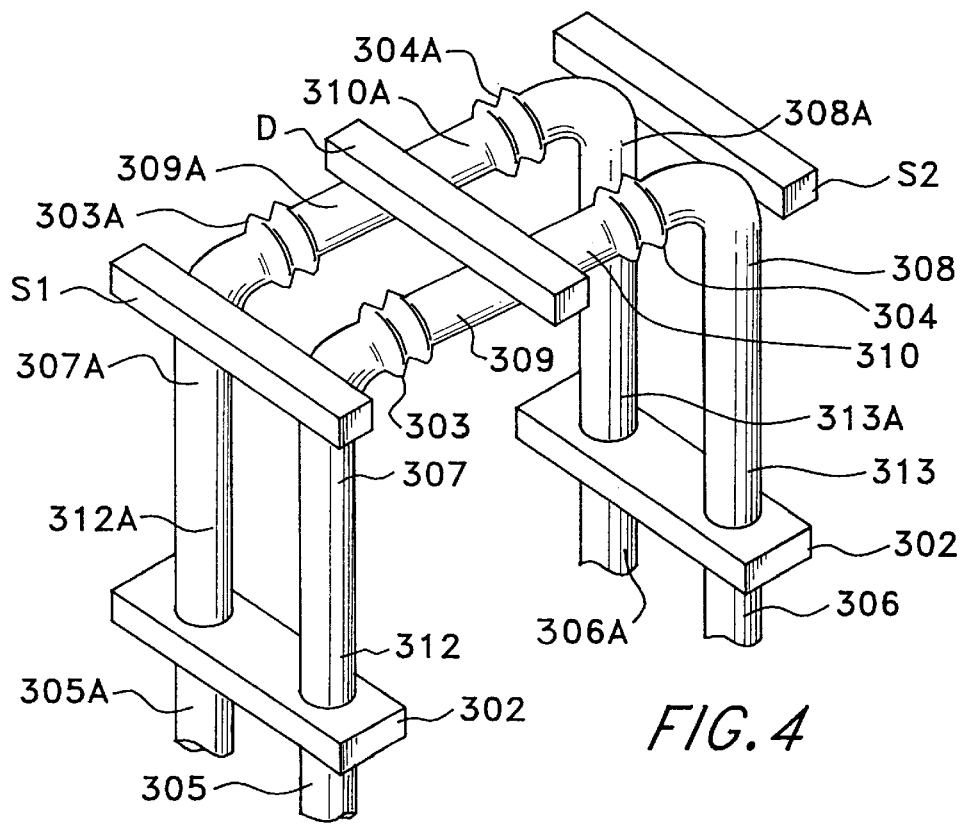

Description of FIGS. 3 and 4

FIGS. 3 and 4 disclose a Coriolis flowmeter 300 having a pair of substantially U-shaped tubes 309 and 309A. With respect to FIG. 3, flow tube 309 has a top member 310, and a pair of side legs 307 and 308. The top member includes a left corrugated portion 303, and a right corrugated portion 304. The left leg includes a lower straight portion 312, a brace bar 302 connected to the bottom end of straight portion 312, and a straight portion 305 interconnecting the lower portion of brace bar 302 with an upper surface of manifold 311. The right side leg includes corresponding elements to that of the left side leg with these including a straight portion 313, a brace bar 302, straight portion 306 interconnecting the bottom surface of right brace bar 302 with the top surface of manifold 311. Sensors S1 and S2, together with driver D, as shown on FIGS. 3 and 4, are coupled to flow tubes 309 and 309A. Tube stubs 111 connect the ends of manifold 311 with flanges 109 which permit flowmeter 300 to be coupled to a flow system (not shown).

On FIG. 4, the rear flow tube 309A has elements corresponding to that above described for flow tube 309 on FIG. 3 except that each rear flow tube on FIG. 4 has a suffix A.

On FIGS. 3 and 4, corrugated portions 303, 303A, 304, and 304A provide increased flexibility of upper members 309, 309A to make them more compliant and sensitive to the generated Coriolis forces resulting from the concurrence of material flow while the flow tubes are oscillated by driver D.

The flow tube portions above brace bars 302 comprise the dynamic portion of the flow tubes; the flow tube portions 305, 306, 305A, and 306A, comprise the static portions of the flow tubes. In operation, as is well known in the art, driver D causes the flow tubes 310 and 310A to oscillate out of phase with respect to each other about brace bars 302 as a pivot point. Manifold 311 of FIG. 3 is omitted on FIG. 4 for purpose of drawing simplicity. However, it is to be understood that, in operation, material enters flowmeter 300 via left flange 109 and flowmeter tube stub 111, proceeds into manifold 311 which causes the received material flow to be split and flow in parallel through flow tubes 309 and 309A. The material flow exits the flow tubes and reenters manifold 311 in which they combine and proceed outward through the right hand flow tube stub 111 and right hand flange element 109.

Corrugations 303, 304, 303A, and 304A, increase the compliance of the upper members 309, 309A of the flow tubes for the detection of Coriolis vibrations. The corrugations are located at points of low bending stress for the drive frequency mode and therefore they have little effect on the drive frequency beyond a slight lowering due to the slight mass increase. However, as subsequently described in detail, corrugations 303 and 304 comprise high stress points for the distortion of the flow tubes with respect to Coriolis forces. Corrugations 303 and 304 are positioned on flow tubes 309 and 309A to increase the flexing capability of the flow tubes with response to the generated Coriolis force. This increased Coriolis sensitivity results in signals of increased magnitude from sensors S1 and S2. This enables the associated meter electronics 102 (of FIG. 1) to generate material flow information of increased accuracy.

Figure 5:
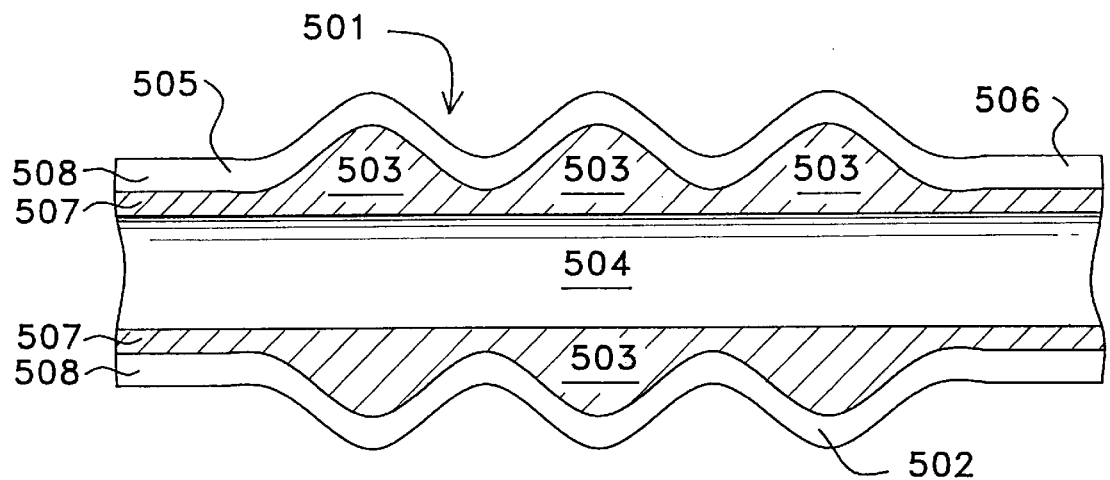
FIG. 5 discloses a Coriolis flow tube having a corrugated exterior and a smooth non-corrugated interior.

Description of FIG. 5

FIG. 5 discloses a Coriolis flow tube 501 having exterior corrugations 502 and a smooth inside flow channel 504. Flow channel 504 is smooth because the space inside of flow tube 501 intermediate the exterior of wall of flow channel 504 and the inner wall portion 508 of the flow tube is filled with a material having a low elastic modulus. The low modulus material (such as rubber) allows the corrugations to expand or contract axially with little restraint. This material fills the inner portion 503 of flow tube 501 and it comprises the inner undulations of the corrugated area. This material also fills the space 507 intermediate the exterior surface of channel 504 and the inner surface of outer wall 508.

The embodiment of FIG. 5 provides a flow channel 504 that is smooth so as to facilitate its cleaning for applications where the inner portion of the flow tube must be cleaned periodically. This is important in the food processing industry where a flowmeter may be used for the flow measurement of different materials. In such applications, it is critical that the flowmeter be cleaned at the termination of the processing of one material prior to the processing of another material. The embodiment of FIG. 5 fulfills this objective by providing a corrugated flow tube 501 that contains a smooth flow channel 504 surrounded by a compliant material in the inner areas 503 and 507 of flow tube 501. The embodiment of FIG. 5 provides a smooth inner flow channel 504 while retaining the advantages of corrugations 502 so that the flow tube 501 is flexible in the same manner as is flow tube 110 of FIG. 1. Flow tube 501 is axially compliant so that it may maintain a fixed overall axial length while being subjected to a wide range of thermal operating conditions.

Figure 6:
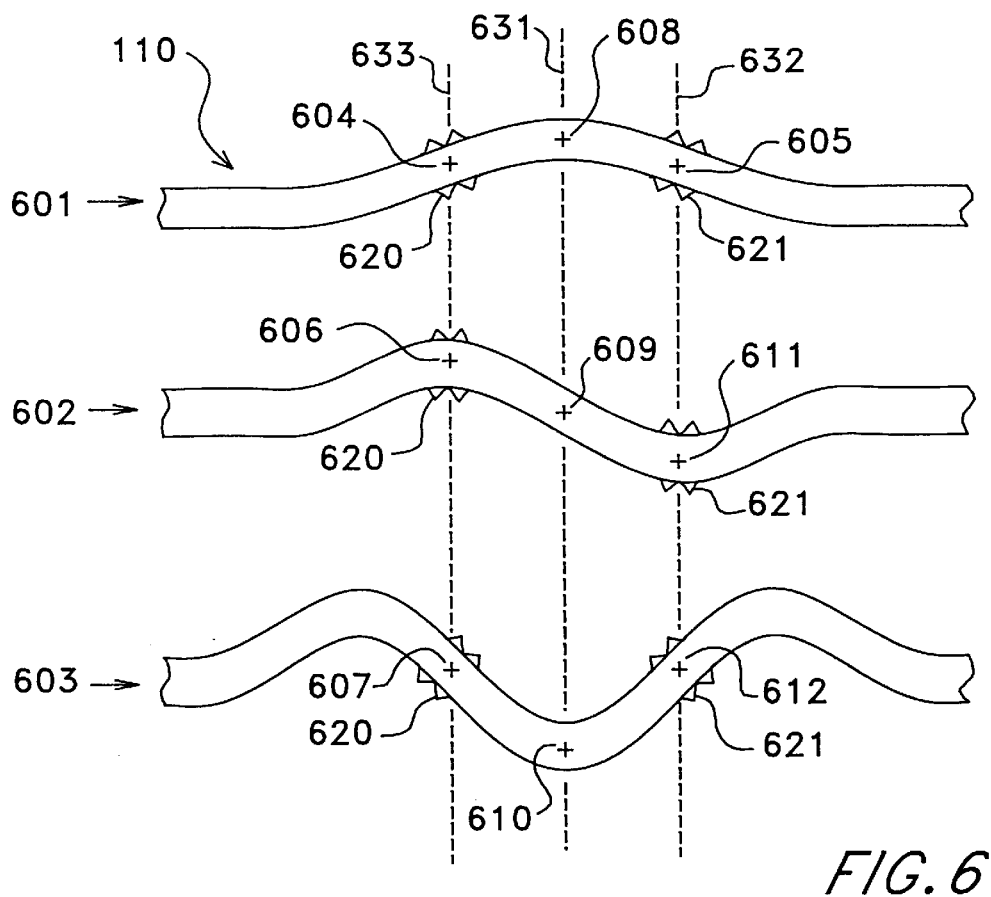
FIGS. 6 and 7 disclose mode shapes of some of the vibrational modes that may be assumed by a straight Coriolis flow tube of FIG. 1.
Figure 7:
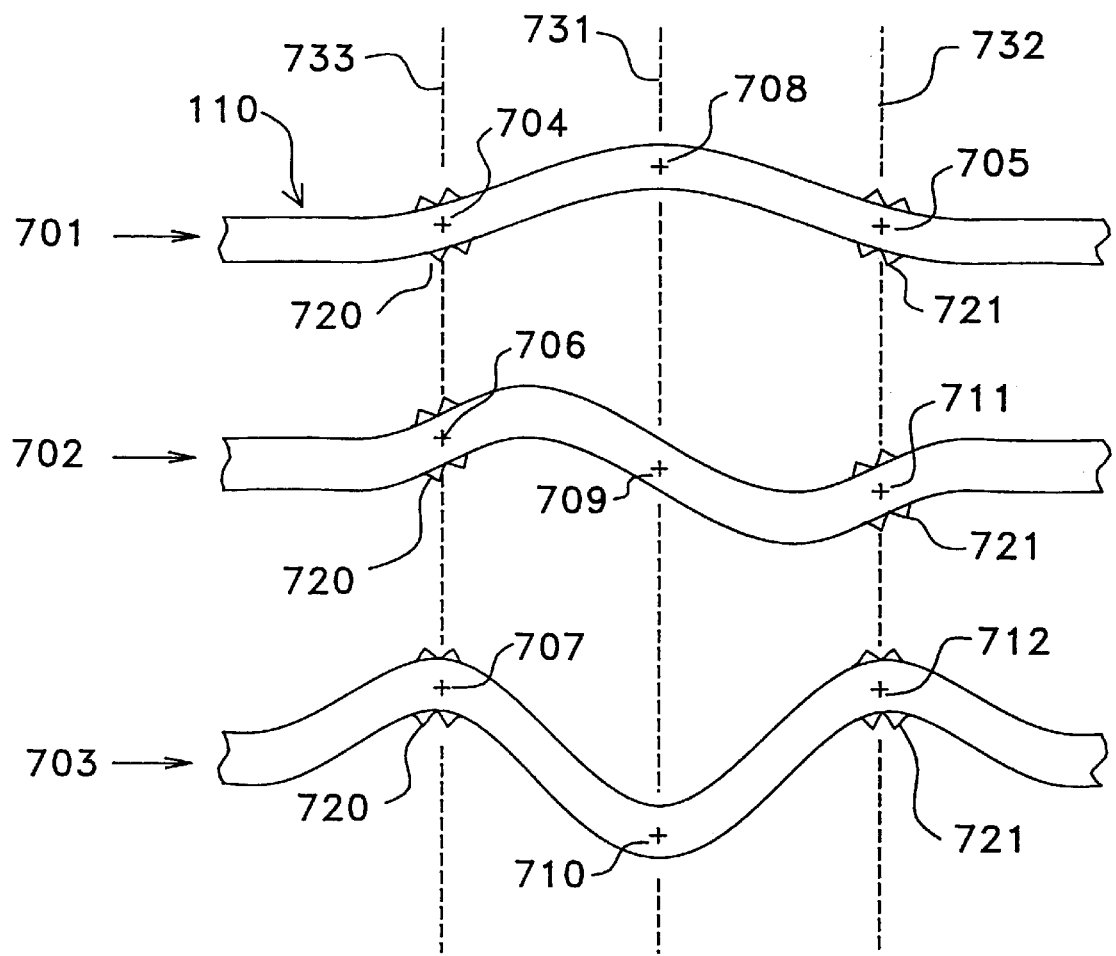

Description of FIGS. 6 and 7

FIG. 6 discloses the first three vibration modes of a straight flow tube such as 110 of FIG. 1. The first, or drive mode is shown as element 601. Element 602 represents the second vibration mode which is coincidently very similar in shape to the Coriolis deflection mode. Element 603 represents the third vibration mode. With respect to element 601, flow tube 110 has corrugations 620 and 621 at flow tube segment 604 and 605. Flow tube segment 608 is coupled to a driver D (not shown on FIG. 6) which receives drive signals from associated electronics element 102 shown on FIG. 1 but not on FIG. 6. These drive signals oscillate the flow tube in the first bending or drive mode portrayed by element 601. In this mode, flow tube 110 has a point of maximum deflection point 608 and inflection points 604 and 605. These inflection points are where the tube curvature changes sign. They are essentially straight and are free of bending moments for a small distance on each side of the center of the inflection point represented by the + symbols. The maximum deflection point 608 is proximate the intersection of dash lines 631 with flow tube 110. The right side of flow tube 110 also has inflection point 605 which is proximate the intersection of dash line 632 with flow tube 110. Flow tube 110 is essentially straight a small distance on each side of the + symbol representing an inflection point. Because flow tube 110 proximate inflection point 605 as well as 604 is relatively free of bending moments, corrugations 620, 621 proximate the inflection points 604 and 605 have little effect on the drive frequency.

Element 602 portrays the Coriolis deflection mode shape of flow tube 110 resulting from the concurrence of the drive mode vibrations imparted by driver D and material flow through flow tube 110. The Coriolis deflection mode shape portrayed by element 602 is greatly exaggerated as compared to element 601 since Coriolis deflections are far smaller in amplitude than the drive mode vibrations. With respect to Coriolis deflection mode shape 602, the 606 segment is curved, the 609 segment is straight and free of bending moments, while the 611 segment is curved. The curved segments 606 and 611 are subject to a maximum bending moment and therefore the provision of corrugations 620 and 621 softens flow tube 110 to increase to its bending compliance. This increases the deflection sensitivity of flow tube 110 to the generated Coriolis forces. This, in turn, provides increased signals from sensors S1 and S2 (FIG. 1) to meter electronics 102 to enable it to generate material flow information of greater accuracy.

The preceding has described the placement of corrugations proximate the tube locations intersecting dash lines 632 and 633. On FIG. 6, the drive frequency of element 601 is unaffected since corrugations 620, 621 are in the straight segments 604, 605 of the flow tube. This placement provides for maximum Coriolis sensitivity of element 602 since the corrugations 620, 621 are at the peak bending segments 606 and 611 of the Coriolis response.

Element 603 of FIG. 6 illustrates the deflection shape of the third vibration mode of flow tube 110. In element 603 the location of the corrugations 620, 621 have little impact upon the third vibration mode since the corrugations are in the straight segments 607, 612 of the flow tube response.

It sometimes occurs in the use of Coriolis flowmeters that a higher frequency vibration mode is at or near the frequency of ambient vibrations surrounding the flowmeter. These ambient vibrations can result from pumps or factory machinery and often are multiples of the 60 hz (50 hz Europe) power frequency. This coincidence of a tube natural frequency and ambient vibrations is undesirable and can induce unwanted vibrations in the flow tube of the Coriolis flowmeter. This can adversely effect the accuracy of the flow information generated by the flowmeter. Prior art arrangements utilized special equipment such as shock absorbers and the like to isolate the Coriolis flowmeter from these undesired vibrations.

The present invention permits the use of corrugations selectively positioned on a flow tube vibration frequency to tune the flow tube so that its higher modes do not coincide with the frequency of ambient vibrations. This is illustrated in FIG. 7 wherein the corrugations 720 and 721 are positioned so that they change the frequency of the third mode of vibration of flow tube 110 as shown by element 703.

Let it be assumed that the flow tube 110 response shown by element 703 is in the same frequency as common ambient noise (300 hz) and that it is desired to shift the frequencies of the flow tube to minimize the ambient noise from imparting unwanted vibrations to the third vibration mode 703. In this case, the corrugations 720, 721 are placed at the locations comprising the intersection of lines 732 and 733 with flow tube 110. The drive frequency of 701 is lowered somewhat since corrugations 720, 721 are now proximate a curved segment of the flow tube. With respect to element 702, corrugations at 706 and 711 have little effect on the Coriolis sensitivity since they occur at inflection points. With respect to element 703, corrugations 720, 721 are at the peaks 707 and 712 of the tube curvature and bending moments. This softens the flow tube in this vibration mode and lowers the mode's natural frequency (280 hz) to better isolate it from the frequency associated with ambient noise (300 hz) as compared to the flow tube locations associated with dash lines 634 and 635 on FIG. 6.

It is to be expressly understood that the claimed invention is not to be limited to the description of the preferred embodiment but encompasses other modifications and alterations within the scope and spirit of the inventive concept.

What is claimed is:

1. A Coriolis flowmeter having flow tube means, drive means for vibrating said flow tube means, and sensor means coupled to said flow tube means for detecting Coriolis deflections of said flow tube means resulting from material flow through said vibrating flow tube means, said sensor means being responsive to said Coriolis deflections for generating output information regarding said material flow; said Coriolis flowmeter further comprising:

said flow tube means having a static portion as well as having a dynamic portion vibrated by said drive means;

mounting means affixed to said static portion of said flow tube means for maintaining said static portion substantially non movable during vibrations of said dynamic portion of said flow tube means;

corrugations on said dynamic portion of said flow tube means for altering vibrational characteristics of at least one vibrational mode of said flow tube means;

said corrugations being at one or more flow tube segments having substantial bending moment in a vibrational mode shape for which said vibrational characteristics are altered;

said corrugations being simultaneously at flow tube segments of low bending moment in a vibrational mode shape for which said vibrational characteristics are not to be altered.

2. The Coriolis flowmeter of claim 1 wherein said flow tube means comprises a single flow tube.

3. The Coriolis flowmeter of claim 1 wherein said flow tube means comprises more than one flow tube.

4. The Coriolis flowmeter of claim 1 wherein said flow tube means is substantially straight.

5. The Coriolis flowmeter of claim 1 wherein said flow tube means is of an irregular shape and has at least one curved segment in its dynamic portion.

6. The Coriolis flowmeter of claim 1 wherein said flow tube means is substantially U-shaped.

7. The Coriolis flowmeter of claim 1 wherein said flow tube means contains said corrugations for less than the entirety of the length of said dynamic portion.

8. The Coriolis flowmeter of claim 1 wherein said flow tube means contains said corrugations at substantially straight segments of at least one vibrational mode shape of said dynamic portion.

9. The Coriolis flowmeter of claim 8 wherein said flow tube means contains said corrugations at substantially low bending stress portions of said dynamic portion of a vibrational drive mode shape of said flow tube means to alter vibrational characteristics of another vibrational mode.

10. The Coriolis flowmeter of claim 8 wherein said flow tube means contains said corrugations at substantially straight segments of a vibrational drive mode shape of said flow tube means as well as substantially straight portions of higher vibrational mode shapes and a curved segment of a Coriolis deflection mode shape of said flow tube means.

11. The Coriolis flowmeter of claim 1 wherein said flow tube means contains said corrugations at substantially curved segments of at least one vibrational mode shape of said dynamic portion.

12. The Coriolis flowmeter of claim 1 wherein said flow tube means contains said corrugations at substantially straight inflection segments of a dynamic portion of its vibrational drive mode shape to alter vibrational characteristics of at least one other of its vibrational modes.

13. The Coriolis flowmeter of claim 1 wherein said flow tube means contains said corrugations at substantially curved segments of a dynamic portion of its vibrational drive mode shape to alter vibrational characteristics of its vibrational drive mode as well as at least one higher vibrational mode.

14. The Coriolis flowmeter of claim 1 wherein said flow tube means is substantially straight and wherein said corrugations in said dynamic portion reduce axial stresses on said flow tube means and said mounting means under varying thermal conditions which said flow tube means may encounter.

15. The Coriolis flowmeter of claim 14 further including:
a case surrounding said flow tube means;
an end member on each end of said case affixed to end segments of said flow tube means;
said dynamic portion of said flow tube means being intermediate said end members;
said corrugations being axially positioned along said flow tube means to reduce axial stresses on said flow tube means resulting from thermal differences between said flow tube means and said case.

16. The Coriolis flowmeter of claim 15 further including:
said flow tube means comprising a single flow tube;
a balance bar surrounding said flow tube and positioned inside of said case;
end members on said balance bar affixed to said flow tube;
said dynamic portion of said flow tube being intermediate said end members of said balance bar;
said corrugations being axially positioned along said flow tube to reduce axial stresses on said flow tube resulting from thermal differences between said flow tube means and said balance bar.

17. The Coriolis flowmeter of claim 1 wherein said corrugations define an exterior surface of said flow tube means as well as a matching inner surface of said flow tube means and wherein said flow tube means comprises:
a liner having a cylindrical smooth inner surface in the interior of said flow tube means;
said liner comprising flexible material occupying space between said matching inner surface of said flow tube means and said cylindrical smooth inner surface of said liner.

18. The Coriolis flowmeter of claim 1 wherein said flow tube means is substantially U-shaped and wherein said corrugations are positioned on an upper portion of said flow tube means comprising a low bending stress portion of a vibrational drive mode shape of said flow tube means.

19. A Coriolis flowmeter having flow tube means, flow tube mounting means, drive means for vibrating said flow tube means, and sensor means coupled to said flow tube means for detecting Coriolis deflections of said flow tube means resulting from material flow through said vibrating flow tube means, said sensor means being responsive to said Coriolis deflections for generating output information regarding said material flow;

said Coriolis flowmeter further comprising:
said flow tube means comprising a first substantially straight flow tube having a non movable static portion and a dynamic portion vibrated by said drive means;
said static portion of said flow tube being affixed to mounting means for maintaining said static portion non movable during said vibrations of said dynamic portion of said flow tube;
a case enclosing said flow tube;
a balance bar positioned inside of said case and surrounding said flow tube;
a case end on each end of said case with each case end being affixed to a different end portion of said flow tube;
an end member on each end of said balance bar with each end member of said balance bar being affixed to a different end portion of said flow tube;
corrugations on said dynamic portion of said flow tube for altering vibrational characteristics of said flow tube;
said corrugations being at one or more flow tube segments of substantial bending moment in a vibrational mode shape for which said vibrational characteristics are to be altered;
said corrugations being simultaneously at flow tube segments of low bending moment in a vibrational mode shape for which said vibrational characteristics are not to be altered;
said corrugations being effective to maintain said flow tube at an axial length determined by the axial length of said balance bar during thermal changes of said flow tube with respect to said balance bar.

20. A Coriolis flowmeter having flow tube means, flow tube mounting means, drive means for vibrating said flow tube means, and sensor means coupled to said flow tube means for detecting Coriolis deflections of said flow tube means resulting from material flow through said vibrating flow tube means, said sensor means being responsive to said Coriolis deflections for generating output information regarding said material flow;

said flow tube means comprising a first and a second substantially straight flow tube positioned substantially parallel to each other and having a non movable static portion and a dynamic portion vibrated by said drive means;
said static portion of each said flow tube being affixed to mounting means for maintaining said static portion nonviable during said vibrations of said dynamic portion of each said flow tube;
a case enclosing said first and second flow tubes;
a case end on each end of said case with each case end being affixed to a different end portion of each of said flow tubes;
corrugations on said dynamic portion of said flow tubes for altering the vibrational characteristics of each said flow tube;
said corrugations being at one or more flow tube segments of substantial bending moment in a vibrational mode shape for which said vibrational characteristics are altered;
said corrugations being simultaneously at flow tube segments of low bending moment in a vibrational mode shape for which said vibrational characteristics are not altered;

said corrugations being effective to maintain each said flow tube at an axial length determined by the axial length of said case during thermal changes of each said flow tube means with respect to said case.

21. A Coriolis flowmeter having flow tube means, drive means for vibrating said flow tube means, and sensor means coupled to said flow tube means for detecting Coriolis deflections of said flow tube means resulting from material flow through said vibrating flow tube means, said sensor means being responsive to said Coriolis deflections for generating output information regarding said material flow;

said Coriolis flowmeter further comprising:

said flow tube means having a static portion and a dynamic portion vibrated by said drive means;

mounting means affixed to said static portion of said flow tube means for maintaining said static portion non movable during vibrations of said dynamic portion of said flow tube means;

corrugations on substantially the entire length of said dynamic portion of said flow tube means for altering vibrational characteristics of said flow tube means.

* * * * *